United States Patent [19]

Nidola et al.

[11] 4,132,620
[45] Jan. 2, 1979

[54] ELECTROCATALYTIC ELECTRODES

[75] Inventors: Antonio Nidola; Placido M. Spaziante, both of Lugano, Switzerland

[73] Assignee: Diamond Shamrock Technologies S.A., Geneva, Switzerland

[21] Appl. No.: 874,863

[22] Filed: Feb. 2, 1978

[51] Int. Cl.² ............ C25B 11/04; H01M 4/86; C01G 17/00; B32B 31/06
[52] U.S. Cl. .................. 204/242; 204/290 R; 204/290 F; 204/291; 252/518; 423/561 R; 427/86; 427/126; 429/44
[58] Field of Search ........... 204/291, 290 F, 290 R, 204/195 M, 242; 429/44; 252/518; 427/86, 126; 423/561 R

[56] References Cited

U.S. PATENT DOCUMENTS

| 3,649,485 | 3/1972 | Chisholm | 204/95 |
| 3,770,613 | 11/1973 | Chisholm | 204/290 R |
| 3,873,473 | 3/1975 | Susa et al. | 252/501 |
| 3,933,688 | 1/1976 | Dines | 252/520 |

FOREIGN PATENT DOCUMENTS

| 7615991 | 1/1977 | France | 204/195 M |
| 50-39638 | 12/1975 | Japan | 423/561 R |
| 51-30784 | 3/1976 | Japan | 204/195 M |

*Primary Examiner*—F.C. Edmundson
*Attorney, Agent, or Firm*—Hammond & Littell

[57] ABSTRACT

Novel electrodes for electrochemical reactions in an electrolytic medium, wherein the active surface layer of the electrode contains an electrocatalytically effective amount of germanium disulfide. The electrodes can be used in electrochemical cells as the catalytic substrates for oxygen evolution, e.g. oxygen evolution anodes in metal electrowinning, or for the conversion of molecular oxygen to an ionized species as in fuel cells.

12 Claims, No Drawings

ELECTROCATALYTIC ELECTRODES

STATE OF THE ART

Dimensionally stable electrodes for electrochemical reactions have recently become of widespread use.

These electrodes employed in electrolytic cells as well as in fuel cells typically have an electrically conductive uncorrodible substrate or base for example of a film-forming passivatable metal such as titanium, zirconium, tantalum, niobium, hafnium, tungsten, silicon or an alloy comprising at least one of these metals. This substrate is coated with a corrosion resistant, nonpassivatable, electroconductive and electrocatalytic material such as a platinum group metal or platinum group metal oxide. The commercially available coatings typically contain a catalytic metal or oxide from the platinum group metals, i.e. platinum, palladium, iridium, ruthenium, rhodium and osmium with a binding or protective agent such as titanium dioxide, tantalum pentoxide and other metal oxides in sufficient amount to protect platinum group metal or oxide from being removed from the electrode in the electrolysis process and to bind the platinum group metal or oxide to the electrode base. The binding and protective metal oxide is usually in excess of the platinum group metal or oxide. Anodes of this nature have been described in British Patent Specification No. 1,231,180.

These known electrodes are particularly useful as anodes in the electrolytic production of halogens from brines.

On the contrary, for electrode reactions involving either the anodic evolution of oxygen typically from acidic or basic aqueous electrolytes or oxygen ionization typically in an alkaline environment the known electrodes have several shortcomings.

One problem is the more or less rapid loss of catalytic activity of the noble metal based coatings which is evidenced by the rise of the oxygen-electrode over-potential after a period of use of 200 to 1000 hours at a current density of 1.2 KA per $m^2$, for example. This increase of electrode overpotential corresponds, generally speaking, to an increase in electrical resistivity at the interface between the substrate and the active coating layer. This increase of resistivity appears to be due to the oxydation of the substrate probably because of oxygen diffusion across the electrocatalytic coating towards the substrate which diffusion process is enhanced by the loss of catalytic activity of the coating itself.

THE INVENTION

According to the present invention there is provided a novel electrode particularly useful for electrochemical reactions involving oxygen evolution and oxygen ionization which comprises an uncorrodible substrate or base having a coating containing an electrocatalytically effective amount of germanium disulfide. Preferably the coating contains 10 to 50, more preferably 20 to 30 g/$m^2$ of germanium disulfide.

The substrate is preferably electrically conductive and may be of any suitable material which is resistant to the corrosion in the specific environment, e.g. wherein oxygen is either evolved or ionized at the electrode surface. Examples of suitable base materials for most applications are valve metals such as titanium, tantalum, niobium, tungsten, hafnium, zirconium, silicon, aluminium and alloys comprising at least one of these metals; valve metal carbides and borides such as titanium carbide, tantalum carbide, tantalum boride; and vitreous carbon as described in U.S. Pat. No. 3,927,181. However, for some applications, for instance oxygen-depolarized cathodes and SPE (solid polymer electrolyte) cells, the coating may be applied to a non-conductive but corrosion resistant porous substrate such as PTFE.

The electrode base or substrate may have any desired configuration such as a plate, mesh or rod but is preferably in the form of a porous body of sintered valve metals, sintered valve metal carbides or vitreous carbon strands, preferably with a porosity of 30 to 70% in order to increase the effective surface area and to improve the adherence of the germanium disulfide coating.

The coating containing the electrocatalytic germanium disulfide may also contain additional electrocatalytic agents such as platinum group metal oxides for example ruthenium dioxide or iridium dioxide as described in U.S. Pat. No. 3,711,385, mixed crystal materials of a platinum group metal oxide and a valve metal oxide, for example ruthenium dioxide-titanium dioxide or iridium dioxide-tantalum pentoxide as described in U.S. Pat. No. 3,632,498, or non-noble metal oxides such as $\beta$-manganese dioxide or $\alpha$-$\beta$ lead dioxide. The base may also be provided with an intermediate coating to improve adherence or other characteristics, for example a coating of a valve metal oxide or of a platinum group metal.

The electrodes may be prepared in various manners. For example, the germanium disulfide may be preformed and then secured to the base in any suitable fashion such as by plasma jet or by deposition with a binding agent such as an organic polymer resistant to the electrolysis conditions or with amorphous valve metal oxide. Another method is to coat the base with a solution of a thermally decomposible salt of germanium, heat the coated base at about 300 to 500° C. in oxygen to evaporate the solvent and form germanium oxide and subject the resulting base to cathodic treatment in the presence of hydrogen sulfide to convert the germanium oxide to germanium disulfide.

In a preferred process of the invention to produce the novel electrode, an electrically conductive porous base made of a corrosion resistant material is impregnated with a slightly acidic solution of a soluble germanate salt, hydrogen sulfide is added to the solution to convert the germanate salt into the corresponding thiogermanate salt and the pH is then reduced (to 2 or less) to precipitate insoluble germanium disulfide in the pores of the base. The electrode can then be removed from the solution and be dried.

Preferably, the solution of germanate salt is an aqueous solution and the salt is an alkali metal or ammonium germanate. The hydrogen sulfide is preferably added by bubbling it through the solution until an excess of the theoretical amount thereof has been added. The acidification may be effected with any mineral or organic acid such as hydrochloric acid, hydrobromic acid, sulfuric acid, nitric acid, phosphoric acid, acetic acid or propionic acid. The electrode can be dried by heating to 75 to 100° C, preferably 80 to 90° C.

The invention also provides an electrolytic process comprising effecting a conversion between molecular oxygen and an ionic species at the surface of an electrode having a coating containing an electrocatalytically effective amount of germanium disulfide.

The process of the invention may be used for the electrolysis of many electrolytes in which oxygen is evolved at the anode at low oxygen evolution potential, such as the electrowinning of copper, zinc, nickel, cobalt and other metals from aqueous sulfuric acid solutions. The electrodes of the invention have the advantages of being resistant to acid conditions and to oxygen evolution, having a low oxygen potential and of not adding impurities to the electrolyte that may cause problems in metal deposition at the cathode.

The electrodes of the invention also show a high catalytic activity for electrochemical oxygenization and are useful in primary and secondary cells, for example fuel cells wherein the electrodes of the invention provide the catalytic side for the conversion of molecular oxygen to an ionic species which then combines with the ionized fuel, for instance with $H^+$ in a hydrogen-oxygen cell to form water over the active surface of the electrode with a net transfer of electrons from the electrode to the reacting species.

A cell of the invention for electrochemical reactions comprises at least one set of a spaced anode and cathode wherein at least one anode or cathode is a dimensionally stable oxygen evolving or oxygen ionizing electrode as discussed above. In embodiments of the cell for the electrolysis of, for example, aqueous metal salt solutions, the cell comprises means for impressing an electrolysis current, and the or each anode has the improved coating containing germanium disulfide.

A typical embodiment of a hydrogen-oxygen fuel cell comprises a hydrogen electrode separated from the oxygen electrode of the invention by an electrolyte saturated inert matrix. Typically the electrolyte is an alkaline aqueous solution and gaseous hydrogen and oxygen are flowed along the respective electrodes to generate electricity, which is utilized by a load connected to the electrodes of the cell.

In the following examples there are described several preferred embodiments to illustrate the invention. However, it should be understood that the invention is not intended to be limited to the specific embodiments.

EXAMPLE 1

A porous sintered titanium base with a porosity of about 50% was impregnated with a slightly acid solution of sodium germanate and, while the base was immersed in the solution, hydrogen sulfide was bubbled through the solution to form sodium thiogermanate. The aqueous solution was adjusted to a pH of about 1 with sulfuric acid which caused germanium disulfide to pecipitate in the porous titanium base and the base was then removed and dried at room temperature. The resulting electrode was used as the anode in an electrolysis cell to electrolyze a 10% sulfuric acid solution at 60° C. and a current density of 0.6 KA/$m^2$. The potential for oxygen evolution was determined initially and after 240 hours of operation at which time the wear rate was also determined. The results are reported in Table I. As a comparison anode, a titanium base with a coating of 35% $Ta_2O_5$ and 65% $IrO_2$, calculated by weight of metal, was also used.

TABLE I

| Anode Coating | Potential V (NHE) initial | 240 hr. | wear rate in g/$m^2$ |
|---|---|---|---|
| $GeS_2$ | 1.50-1.60 | 1.52-1.6 | nil |
| $Ta_2O_5$—$IrO_2$ | 1.50 | 1.52 | nil |
| reversible potential | | 1.34 | |

Table I shows that the germanium disulfide anode coating has a low oxygen evolution potential without any catalytic aging and only a negligible wear rate after 240 hours of operation.

EXAMPLE 2

Using the procedure of Example 1, a porous sintered titanium base was coated with 20 g/$m^2$ of germanium disulfide and the resulting electrode was used as an anode in the electrolysis of 10% aqueous sulfuric acid at a current density of 200 A/$m^2$ at different temperatures. The potential for oxygen evolution was determined initially and after 1000 hours of operation. The results are reported in Table II.

TABLE II

| Temp. in °C | Oxygen evolution potential V (NHE) initial | after 1000 hr. |
|---|---|---|
| 40 | 1.73 | 1.75 |
| 60 | 1.70 | 1.78 |
| 80 | 1.68 | >2.0 |

Using the same electrodes, 10% aqueous sulfuric acid was electrolyzed at 60° at varying current densities and the results are reported in Table III.

TABLE III

| Current density A/$m^2$ | Oxygen evolution potential V(NHE) initial | 1000 hrs. |
|---|---|---|
| 500 | 1.65 | 1.70 |
| 1000 | 1.70 | 1.78 |
| 1500 | 1.75 | 1.88 |
| 2000 | 1.80 | >2.0 |

Using the same procedure, 10% aqueous sulfuric acid was electrolyzed at 60° C. and a current density of 2000 A/$m^2$ using a sintered titanium base coated with varying amounts of germanium disulfide and the results are reported in Table IV.

TABLE IV

| Coating Amount g/$m^2$ | Oxygen evolution potential V(NHE) initial | 1000 hrs. |
|---|---|---|
| 10 | 1.70 | >2.0 |
| 20 | 1.70 | 1.78 |
| 30 | 1.70 | 1.80 |

Various modifications of the products and processes of the invention may be made without departing from the spirit or scope thereof and it is to be understood that the invention is to be limited only as defined in the appended claims.

We claim:

1. An electrode for electrochemical reactions, comprising a corrosion resistant substrate having a coating which contains an electrocatalytically effective amount of germanium disulfide.

2. The electrode of claim 1 wherein the coating contains 10 to 50 g/$m^2$ of germanium disulfide.

3. The electrode of claim 2 wherein the coating contains 20 to 30 g/$m^2$ of germanium disulfide.

4. The electrode of claim 1 wherein the substrate consists of a material selected from the group consisting of valve metals, vitreous carbon and valve metal carbides.

5. The electrode of claim 1 wherein the substrate consists of a porous electrically conductive material having a porosity of 30 to 70%.

6. The electrode of claim 5 wherein the porous substrate material is selected from the group consisting of sintered valve metals, sintered valve metal carbides and vitreous carbon strands.

7. An electrode for electrochemical reactions comprising a corrosion resistant porous substrate having a coating which contains an electrocatalytically effective amount of germanium disulfide applied by impregnating the substrate with a slightly acidic solution of a soluble germanate salt, adding hydrogen sulfide to said solution to convert the germanate into the corresponding thiogermanate and reducing the pH to precipitate insoluble germanium disulfide in the pores of the substrate.

8. A process for the preparation of an electrode for electrochemical reactions comprising a corrosion resistant porous substrate having a coating which contains an electrocatalytically effective amount of germanium disulfide, the process comprising impregnating the porous substrate with a slightly acidic solution of a soluble germanate salt, adding hydrogen sulfide to said solution to convert the germanate into the corresponding thiogermanate and reducing the pH to precipitate insoluble germanium disulfide in the pores of the substrate.

9. An electrochemical process which comprises effecting a conversion between molecular oxygen and an ionic species at the surface of an electrode having a coating containing an electrocatalytically effective amount of germanium disulfide.

10. The process of claim 9, comprising anodically polarizing said electrode in an aqueous electrolyte to evolve oxygen at said electrode.

11. A cell for electrochemical reactions comprising at least one set of spaced electrodes wherein at least one electrode comprises a corrosion resistant substrate having a coating which contains an electrocatalytically effective amount of germanium disulfide.

12. An electrolysis cell comprising at least one anode and cathode and means for impressing an electrolysis current, wherein the anode comprises a corrosion resistant electrically conductive substrate having a coating which contains an electrocatalytically effective amount of germanium disulfide.

* * * * *